United States Patent [19]

Sorenson

[11] 4,191,872
[45] Mar. 4, 1980

[54] SWITCH CASE WITH STACKABLE LOCK WASHER

[75] Inventor: Richard W. Sorenson, Avon, Conn.

[73] Assignee: Carlingswitch, Inc., West Hartford, Conn.

[21] Appl. No.: 20,489

[22] Filed: Mar. 14, 1979

[51] Int. Cl.² .................... H01H 9/02; F16B 43/00
[52] U.S. Cl. .................................. 200/296; 85/50 R
[58] Field of Search ............ 200/296, 301, 302, 294; 85/50 R, 50 C, 50 AT; 248/638; D23/47; D8/399; 277/136, 166, 167.3

[56] References Cited

U.S. PATENT DOCUMENTS

| | | | |
|---|---|---|---|
| 2,363,319 | 11/1944 | Hanson | 85/50 R |
| 2,639,789 | 5/1953 | Rosenberg | 85/50 R X |
| 3,177,456 | 4/1965 | Haydu et al. | 85/50 R |
| 3,411,377 | 11/1968 | Golbeck | 200/296 X |
| 4,067,184 | 1/1978 | Johnson, Jr. | 85/50 R X |

*Primary Examiner*—Steven M. Pollard
*Attorney, Agent, or Firm*—McCormick, Paulding & Huber

[57] ABSTRACT

A plastic washer is disclosed having a radially inwardly projecting tab for mating with the slot in a conventional threaded switch barrel, and the washer may be stacked with other similar washers in spite of the fact that each washer defines a projecting post adapted to mate with a locating hole provided for this purpose in the panel where the switch is to be mounted. Each washer also includes an open cavity or hole for receiving the post of an adjacent washer so that the washers can be stacked, and can also be used to locate the switch housing angularly with respect to the generally circular opening normally provided in the panel for such a switch. The same washer is also useful as a lock washer due to its resilient plastic composition.

3 Claims, 6 Drawing Figures

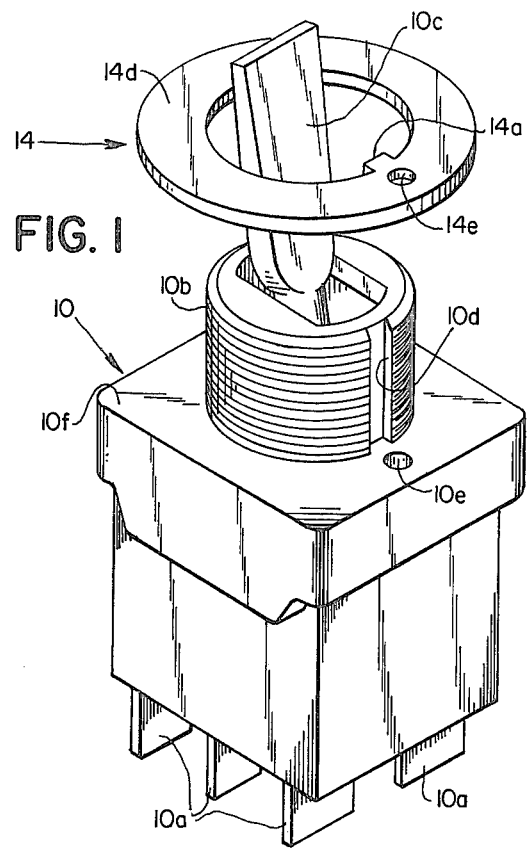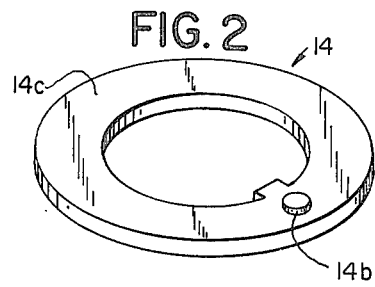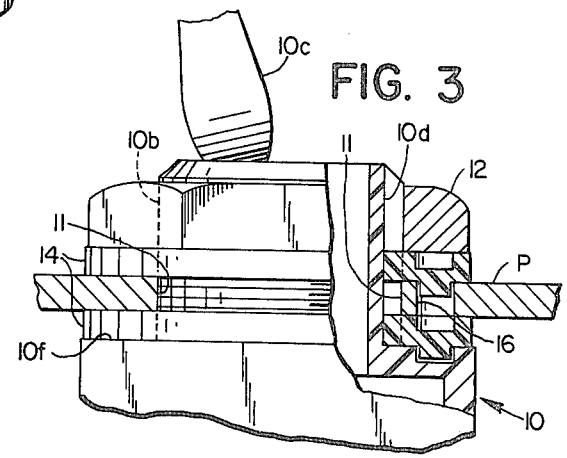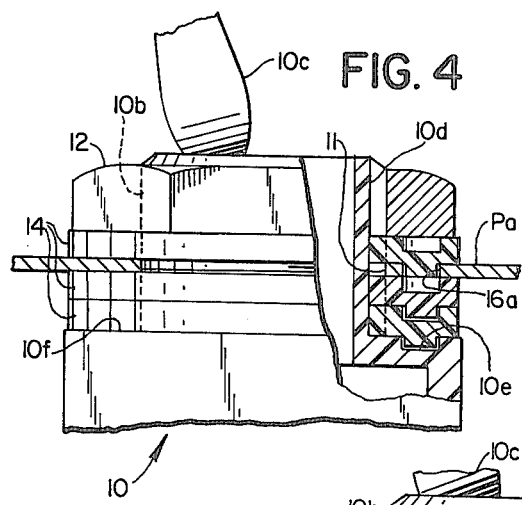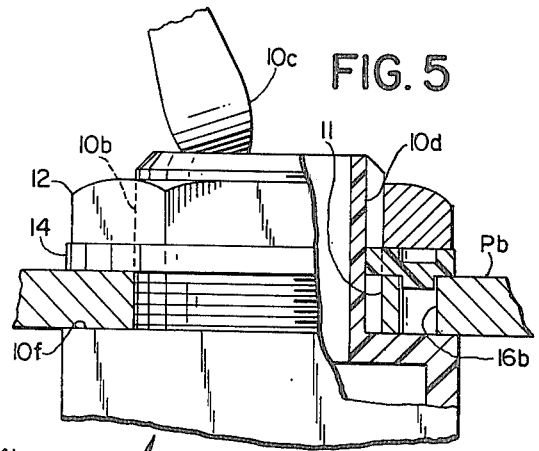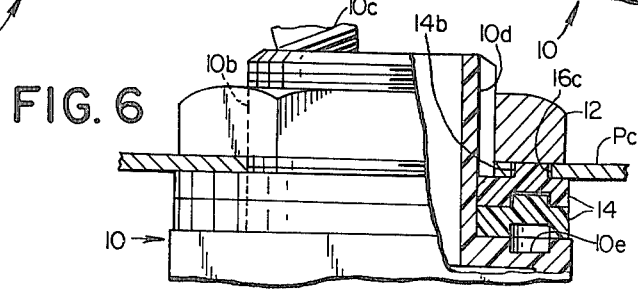

SWITCH CASE WITH STACKABLE LOCK WASHER

SUMMARY OF THE INVENTION

This invention relates generally to means for mounting switches in panel openings of circular contour, and deals more particularly with a lock washer designed for use in both locating, and locking the switch with respect to the panel so that a desired anglular configuration is maintained, which washer is also suitable for spacing the switch axially with respect to the panel so that the projecting threaded barrel portion of the switch can be conveniently anchored in place by a conventional nut.

The general object of the present invention is to eliminate the necessity for providing switch customers with two or three different styles of metal washers so that the customer can assemble such as switch in his particular panel in the desired angular configuration with respect to the panel, and also with the desired projection of the threaded boss or barrel above the surface of the panel, all with the provision of a single type of stackable lock washer suitable for use in locating and locking the switch in the panel opening and for spacing the switch axially with respect to the panel.

In carrying out the foregoing object of the present invention the switch housing itself may have an opening for receiving a downwardly projecting post integrally formed in the underside of the lock washer, and it is an important feature of the present invention that each such washer also includes a cavity in its upper surface such that the post of an adjacent washer can be received therein. In this manner, the washers can be stacked one on top of another with the surfaces of adjacent washers in mating contact with one another in order to provide for axial spacing of the switch with respect to a panel. Normally, the panel is provided with a circular opening suitable for receiving a cylindrical boss, or threaded barrel portion of the switch housing. Such threaded barrel generally has an elongated slot extending from one end of the barrel to the switch case itself, and generally, a locking washer is provided with a radially inwardly projecting tab for mating with this slot, plus one or more conventional washers to permit the switch to be installed with a downturned tab on the locking washer mating with a locating hole provided for this purpose in the panel in order to prevent angular movement of the switch housing with respect to the panel. This invention eliminates the need for such a washer, and for the necessity to provide a customer with one or more conventional washers. In lieu thereof, several plastic washers are provided, each of which has a radially inwardly projecting tab for mating with the slot in the threaded barrel, and each washer has integrally formed therein a post for mating with a locating hole provided for this purpose in the panel. In addition the plastic washer of the present invention also includes a cavity, defined opposite the integrally formed post, such that two similar washers can be stacked one next to the other for achieving the desired axial spacing of the switch housing with respect to the panel.

BRIEF DESCRIPTION OF THE DRAWINGS

FIG. 1 is a perspective view of a switch housing having a lower generally rectangular case with projecting terminals and having a threaded upper barrel portion or boss, which boss is open at the upper end so that an operating member or bat may be provided for manipulating this switch between on and off positions, or other conventional switch configurations. A washer is also shown in FIG. 1 in position for being received on the threaded barrel of the switch itself.

FIG. 2 is a perspective view of the washer of FIG. 1 but showing the washer reversed, that is the underside of the washer of FIG. 1 appears on the top of the washer of FIG. 2.

FIG. 3 is an elevational view partly in section, but drawn to a somewhat larger scale, illustrating the switch of FIG. 1 mounted in a panel, with two washers provided, one on each side of the panel, and in addition, a lock nut for holding the assembly in place.

FIG. 4 is a sectional view similar to FIG. 3 but illustrating a slightly different configuration for the stackable washers of the present invention, such as might be adopted for use in assembling the FIG. 1 switch with a thin panel.

FIG. 5 is a view similar to FIGS. 3 and 4 but with still a third alternative configuration for the washer of the present invention as used in an assembly of the switch of FIG. 1 with a panel to illustrate use with a thick panel.

FIG. 6 is a view similiar to FIGS. 3, 4 and 5 but showing still another possibility for assembling a switch to a panel with one or more washers of the present invention.

DETAILED DESCRIPTION

Turning now to the drawing in greater detail, FIG. 1 shows a switch housing 10, which is of generally rectangular configuration and includes depending terminals 10a which terminals are adapted to be connected to electrical connectors or the like. Such a switch is usually mounted in a panel P of the type shown in FIG. 3, and the switch 10 includes an upwardly projecting threaded barrel 10b which is of generally cylindrical configuration and adapted to be received in a circular opening 11 provided for this purpose in the panel P. The switch 10 must be angularly oriented with respect to such a panel P, and also must be spaced axially so that a conventional threaded nut 12 can be provided on the threaded barrel 10b with the desired degree of projection for the barrel above the upper surface of the nut 12 as shown in FIGS. 3, 4 and 5. The switch 10 has an operating lever in the form of a paddle or bat so as to move a movable contact (not shown) and thus achieve the desired electrical condition within the switch, but it will be apparent to those skilled in the art that other operating members might be substituted for the bat 10c without departing from the scope of the present invention.

Conventionally, switches of the type shown at 10 in FIG. 1 are mounted in a panel by means of a threaded nut of the type shown at 12 in FIGS. 3, 4 and 5 together with a variety of conventional metal washers of annular configuration, one of which will generally include a bent tab to permit locating the switch angularly with respect to the hole 11. In order to provide for angular orientation of the switch 10 with respect to the panel P the threaded barrel 10b preferably has an elongated slot extending from one end of the barrel to the switch case, as best shown at 10d in FIG. 1, and the metal washer generally provided has a radially inwardly projecting tab similar to that shown at 14a in FIGS. 1 and 2. Although such conventional washers heretofore used did have a downturned tab provided adjacent the periphery of the washer, so that it could be received in a small locating hole provided for this purpose in the panel P, only one such washer is generally provided by the switch manufacturer, along with other more conventional washers, with the result that two or three different types of washers are required for each switch. A locating hole, as indicated generally at 16 in FIGS. 3, 4 and 5 was also used heretofore, and it will be apparent that this locating hole 16 is used for substantially the same purpose pursuant to the teachings of the present invention. However, as will be described in greater detail hereinbelow with reference to the plastic washer 14 of FIG. 2, only one such washer type is now required. By way of summary then the conventional practice currently extant in the industry calls for the provision of two or three different types of metal washers to be supplied with a conventional switch of the type illustrated in FIG. 1. One washer being of conventional configuration, and another being suitable for locking the switch housing in a particular orientation with respect to the panel, and a further washer being provided with projecting locking portions suitable for preventing loosening of the switch and its associated panel opening.

With particular reference to FIG. 2, the lock washer 14 of the present invention includes an inwardly projecting tab 14a similar to that mentioned previously with reference to the existing single locking washer, and also includes a projecting post 14b, which post is adapted to be received in a locating hole, such as that described above with reference to 16 in the panel P, in order to permit locating the switch housing angularly with respect to the panel opening. Although this configuration is similar to that described above with reference to the current conventional practice, the structure is quite different in that the post 14b of washer 14 is defined on the lower surface 14c of the plastic washer 14 and is preferably in the form of a short cylindrical post as shown. This particular configuration for the post 14b permits it to be readily received in a cylindrical cavity 14b defined for this purpose in the top surface 14d of the washer 14 making the plastic washer 14 quite unlike the single metal locking washer described above. This disclosure relates to a single washer configuration which may be used in conjunction with a particularly thin panel, Pa in FIG. 4, or a particularly thick panel, Pb in FIG. 5, as well as with the panel P in FIG. 3.

The plastic material from which the washer 14 is preferably constructed should comprise nylon or similar material such that the resiliency of the material itself serves to aid in anchoring the nut 12 in a secure position so that the washer 14 also serves a conventional "lock washer" function. However, this "lock washer" function should not be confused with the angular locking function described above with reference to this plastic washer.

It should also be noted that the switch 10 shown in FIG. 1 is itself preferably formed of plastic insulating material, and that the surface 10f, which either engages the underside of the panel P or the underside of one of the washers 14, itself includes a cavity 10e such that it too can receive a depending post of the type shown at 14b in FIG. 2 should this geometrical arrangement be necessary for locating the switch axially in a panel P as shown in FIGS. 3 and 4 for example.

In conclusion then, the plastic washer 14 permits the switch installer to use only one type of washer to install a particular switch 10 in panels of various thickness (as illustrated in FIGS. 3, 4 and 5) thereby obviating the need for the switch manufacturer or supplied to provide two or three different types of washers as now required to properly install such switches. In FIG. 6 I have shown still another preferred arrangement utilizing the unique plastic washers 14, 14 behind panel Pc so that the nut 12 engages the face of this panel. In this construction one can assemble the switch 10 in the panel Pc so that the washer 14 does not show from the front of the panel. However, the unique washer 14 must be reversed in this FIG. 6 assembly so that the post 14b projects upwardly into the panel locating hole 16c (rather than depending downwardly as suggested in FIGS. 3, 4 and 5). Other washer configurations will be apparent from this description, and the invention resides in my unique washer as used in the enviroment of mounting a switch in a panel.

I claim:

1. In a switch having a case and a threaded barrel with a slot extending from one end of the barrel to the switch case, said switch being for use in a panel with a circular opening for receiving the barrel, and the panel further including a locating hole adjacent to the circular opening for orienting the switch angularly with respect to the panel, the improvement comprising a series of stackable washers, each of which washers is adapted to be slidably received on the switch barrel for use in spacing the switch casing axially relative to the panel, each said washer having a radially inwardly projecting tab adapted to fit slidably in the barrel slot, each said washer further having axially spaced upper and lower faces, one of said faces having a projecting post defined therein adapted to be received in the panel locating hole, and the other of said washer faces defining a post opening for receiving the post on an adjacent washer, whereby each of said washers can be used not only as a washer for axial spacing of the switch with respect to the panel, but also for use in locating the switch angularly with respect to the panel.

2. The combination of claim 1 wherein each said washer is fabricated from a resilient plastic material.

3. The combination of claim 2 wherein each said washer has said post formed integrally therein, and said post opening defined in axially opposed relationship to said integral post.

* * * * *